April 29, 1958 L. J. LINDSEY 2,832,520
FISHING POLE CARRIER FOR AUTOMOBILES
Filed Aug. 5, 1955
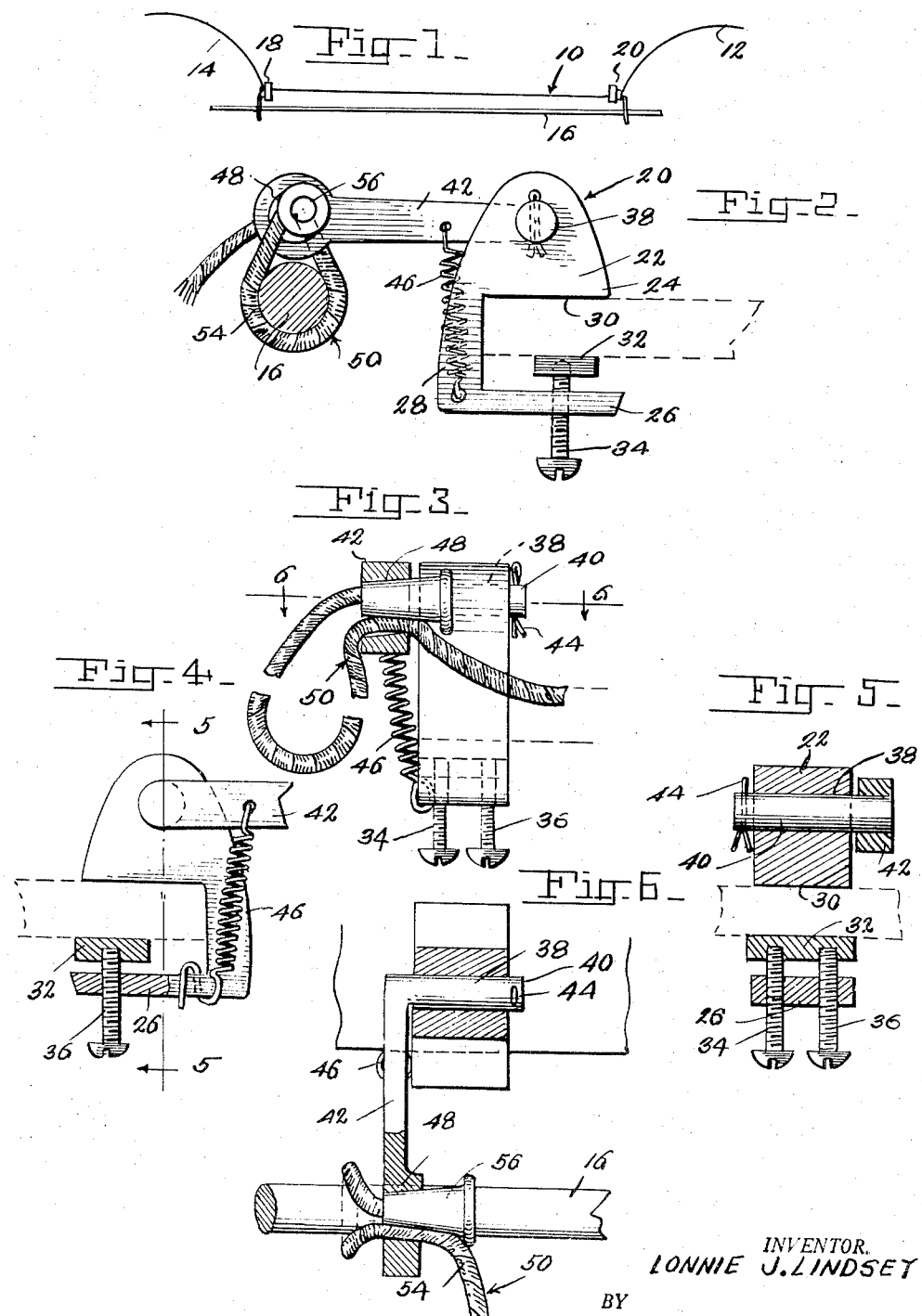
INVENTOR.
LONNIE J. LINDSEY
BY
Patrick D. Beavers
ATTORNEY

United States Patent Office 2,832,520
Patented Apr. 29, 1958

2,832,520

FISHING POLE CARRIER FOR AUTOMOBILES

Lonnie J. Lindsey, Memphis, Tenn.

Application August 5, 1955, Serial No. 526,754

1 Claim. (Cl. 224—42.31)

This invention appertains to improvements in fishing pole carriers and is particularly directed to carrier means attachable to automobiles so as to attach fishing poles and the like shafts exteriorly of an automobile.

A primary object of this invention is to provide clamp means releasably attachable to the fenders of an automobile and having means for releasably and securely receiving a fishing pole and positioning the pole longitudinally of the automobile below the door line.

Another object of this invention is to provide said clamp means with an opening and to provide a length of cord having a tapered knob, said cord being passed through the opening to provide a loop, which is circumposed on the pole, and the knob being wedged in the opening to hold the loop tight and free from slippage.

A further object of this invention is to provide an arm having a lateral offset journaled in the opening in the clamp means and a spring, connected between the clamp means and the arm, for maintaining the arm in a fixed position and to provide an opening in the arm for receiving the cord and knob.

The foregoing and ancillary objects, including the provision of a simple, compact and sturdy pole carrier for automobiles are attained by this invention, the preferred form of which is shown in the attached drawing, wherein:

Figure 1 is a side elevational view of an automobile showing a pole attached thereto by a carrier means in accordance with this invention;

Figure 2 is a side elevational view of one part or clamp of the carrier means;

Figure 3 is a front elevational view thereof with part of the arm broken away to show the means for receiving the pole to the arm;

Figure 4 is vertical sectional view showing the movable jaw and the spring means for the arm;

Figure 5 is a vertical sectional view taken on line 5—5 of Figure 4, and

Figure 6 is a cross-sectional view taken on line 6—6 of Figure 3.

Referring now more particularly to the drawing, the numeral 10 designates a conventional type automobile having front and rear fenders 12 and 14. The carrier means for attaching a fishing pole 16 or similar elongated shaft thereto includes two identical clamping units 18 and 20, one being attached to the rear fender and the other to the front fender and supporting the pole in a position longitudinally of the automobile and below the door line.

As shown in Figures 2–6, the clamping unit 20 includes a U-shaped body section 22 having opposing legs 24 and 26, which are connected by a bight portion 28. The inner faces of the legs are straight and in parallelism with the inner face 30 of the leg 24 forming a fixed jaw. A movable jaw or plate 32 is carried by the other leg 26. In this respect, screws 34 and 36 are threaded transversely through the leg 26 and have their inner ends rotatably seated, against axial relative movement, in the rear face of the plate 32 so that rotation of the screws moves the movable jaw relative to the fixed jaw. Both of the confronting faces of the jaws are flat and smooth so as to clampingly engage the edge of a fender, without marring or scratching the finish.

The leg 24 is triangular shaped in elevation and is provided with a transverse opening 38 to receive a laterally offset journal 40 on an arm 42, which is thereby attached to the leg. A cotter pin 44 holds the journal in the leg with the arm being rotatably attached thereby to the leg.

A coil spring 46 is connected between the arm and the leg 26 to maintain the arm fixed in a perpendicular depending position. The lower end of the arm is formed with an opening 48 to receive a flexible fastening means 50, which attaches the pole 16 to the clamping units.

The fastening means 50 includes a length of cord or rope 54, which has a tapered knob 56 fixed on one end. The cord is formed to make a loop 58 in which the pole is positioned so that the loop is fixedly circumposed on the pole. One end of the loop has the knob 56 while the other end is passed through the opening 48 and held in place by the knob that is wedged in the opening to wedge the other end tightly against the bounding wall of the opening and prevent the loop from slipping.

In use, the clamping units are attached by the clamping engagement of the fixed and movable jaws onto the edges of the fenders with the arms depending from the body sections. The cords are looped around the pole and wedged in place by the knobs 56.

Depending upon the type and model of automobile, the arms 42 may be dispensed with and the cords fastened in place, after being looped around the pole, in the openings 38 in the legs 24.

While the best known form of this invention has been shown and described, other forms may be realized as coming within the scope of the invention, defined by the appended claim.

I claim:

A fishing pole carrier for securing a fishing pole to the fenders of an automobile so that the pole extends longitudinally of the automobile below the door line; said carrier comprising a pair of clamps, each clamp being U-shaped and having means releasably fastening it to the edge of a fender so that one leg is disposed exteriorly of the fender, said one leg having an aperture disposed parallel to the longitudinal axis of the automobile, an arm having a journal offset from one end thereof and rotatably mounted in the aperture whereby said arm may swing outwardly with respect to said clamp, spring means connected between the arm and the clamp for maintaining the arm in a vertically dependent position, said arm having an apertured lower end, and a flexible fastener having means fastening it in the lower end and forming an adjustable loop for receiving a pole.

References Cited in the file of this patent

UNITED STATES PATENTS

| | | |
|---|---|---|
| 1,552,535 | Beerstecher | Sept. 8, 1925 |
| 1,827,498 | Weeks | Oct. 13, 1931 |
| 2,228,593 | Dibble et al. | Jan. 14, 1941 |
| 2,248,170 | Hansen | July 8, 1941 |
| 2,443,335 | Vogel | June 15, 1948 |
| 2,579,062 | Aab | Dec. 18, 1951 |
| 2,716,531 | Johnson | Aug. 30, 1955 |